US012638644B2

(12) United States Patent
Coffy et al.

(10) Patent No.: US 12,638,644 B2
(45) Date of Patent: May 26, 2026

(54) INTEGRATED CIRCUIT COMPRISING AN ASSEMBLY OF AN ELECTRONIC CHIP, AN OPTICAL ELEMENT AND A SUBSTRATE AND CORRESPONDING MANUFACTURING METHOD

(71) Applicant: STMicroelectronics (Grenoble 2) SAS, Grenoble (FR)

(72) Inventors: Romain Coffy, Voiron (FR); Younes Boutaleb, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 254 days.

(21) Appl. No.: 18/389,377

(22) Filed: Nov. 14, 2023

(65) Prior Publication Data

US 2024/0168245 A1     May 23, 2024

(30) Foreign Application Priority Data

Nov. 18, 2022     (FR) ...................................... 2212007

(51) Int. Cl.
*G02B 6/42*     (2006.01)

(52) U.S. Cl.
CPC ......... *G02B 6/4257* (2013.01); *G02B 6/4238* (2013.01); *G02B 6/4239* (2013.01); *G02B 6/4245* (2013.01); *G02B 6/4274* (2013.01)

(58) Field of Classification Search
None
See application file for complete search history.

(56) References Cited

U.S. PATENT DOCUMENTS

| | | | | |
|---|---|---|---|---|
| 4,663,652 | A * | 5/1987 | Nishizawa .............. | H01L 24/29 |
| | | | | 257/E33.071 |
| 5,998,862 | A * | 12/1999 | Yamanaka .............. | H10F 77/50 |
| | | | | 257/E31.118 |
| 6,396,116 | B1 * | 5/2002 | Kelly ...................... | H10F 77/50 |
| | | | | 257/E31.127 |
| 11,049,899 | B2 * | 6/2021 | Wang ..................... | H01L 25/042 |
| 2001/0048064 | A1 * | 12/2001 | Kitani ................... | H10F 39/804 |
| | | | | 257/E31.117 |
| 2005/0078207 | A1 * | 4/2005 | Minamio .............. | H10F 39/804 |
| | | | | 348/340 |
| 2008/0191300 | A1 * | 8/2008 | Nystrom ............... | H10F 39/811 |
| | | | | 257/E31.127 |

(Continued)

FOREIGN PATENT DOCUMENTS

EP        2876682 A1     5/2015

OTHER PUBLICATIONS

INPI Search Report and Written Opinion for priority application, FR 2212007, report dated May 4, 2023, 8 pgs.

*Primary Examiner* — Jerry Rahll
(74) *Attorney, Agent, or Firm* — Crowe & Dunlevy LLC

(57)        ABSTRACT

An integrated circuit package includes an assembly of an electronic integrated circuit chip, an optical element and a support substrate. The support substrate includes a mounting face and has an opening sized and shaped to containing the electronic integrated circuit chip. The optical element includes a connection face connected to the mounting face of the support substrate and is positioned opposite to said opening. The electronic integrated circuit chip is connected to the connection face of the optical element such that the electronic chip is housed in said opening of the support substrate.

16 Claims, 3 Drawing Sheets

(56)　　　　　　References Cited

U.S. PATENT DOCUMENTS

| | | | |
|---|---|---|---|
| 2010/0038017 A1* | 2/2010 | Egawa ................... | H04N 23/54 |
| | | | 156/145 |
| 2013/0271649 A1* | 10/2013 | Halliday ............... | H04N 23/55 |
| | | | 348/374 |
| 2015/0214265 A1* | 7/2015 | Ishida ................... | H10F 39/811 |
| | | | 250/208.1 |
| 2017/0097480 A1* | 4/2017 | Wang ...................... | H10F 77/50 |
| 2019/0258019 A1* | 8/2019 | Ohara ................... | H05K 1/183 |
| 2020/0212096 A1 | 7/2020 | Nagai et al. | |

* cited by examiner

INTEGRATED CIRCUIT COMPRISING AN ASSEMBLY OF AN ELECTRONIC CHIP, AN OPTICAL ELEMENT AND A SUBSTRATE AND CORRESPONDING MANUFACTURING METHOD

PRIORITY CLAIM

This application claims the priority benefit of French Application for Patent No. 2212007, filed on Nov. 18, 2022, the content of which is hereby incorporated by reference in its entirety to the maximum extent allowable by law.

TECHNICAL FIELD

Embodiments and implementations relate to the field of electronics and, in particular, to the field of packaging of integrated circuits, for example as used in optoelectronic devices such as image sensors.

BACKGROUND

Optoelectronic devices, also called optical devices, are electronic devices capable of receiving or transmitting an optical signal, such as light radiation in the visible or infrared spectrum for example.

This type of integrated circuit typically includes an assembly of an optical element and an electronic integrated circuit chip in a package.

The optical element allows carrying out one or more optical functions, such as a polarization, a filtering or a lensing effect, on the optical signal passing therethrough and used by the electronic chip.

The electronic chip allows, for example, converting an optical signal into an electrical signal or an electrical signal into an optical signal.

The package for an optical device conventionally comprises a substrate on which the electronic chip rests and a cover provided with an optical element. The cover is typically used as a support for the optical element. In this manner, the optical element is positioned opposite to the optical components of the electronic chip, typically located in a cavity protecting the electronic chip, formed in the cover and closed by the optical element.

Moreover, bonding wires are conventionally used to electrically connect the electronic chip to the substrate. These bonding wires typically extend above the electronic chip such that the volume of the cavity is intended to contain them.

Consequently, a relatively large volume of air can be trapped in the cavity formed by the cover of the integrated circuit and can generate, during temperature rises, a pressure force by expansion of the trapped air which can damage the case, for example cause a detachment of the optical element from the rest of the cover, or a detachment of the cover from the support substrate.

There is consequently a need to propose a solution allowing limiting or even preventing the problems related to the expansion of the air in the case in order to avoid damage to the integrated circuit case.

SUMMARY

According to one aspect, an integrated circuit is proposed comprising an assembly of an electronic chip, an optical element and a support substrate, in which: the support substrate comprises a mounting face and has an opening containing the electronic chip; the optical element includes a connection face connected to the mounting face of the support substrate and is positioned opposite to said opening; and the electronic chip is connected to the connection face of the optical element such that the electronic chip is housed in said opening of the support substrate.

Thus, it is proposed, on the one hand, to mount the electronic chip on one face of the optical element, in a configuration corresponding to the mounting technique referred to in the art as a "flip-chip" orientation, and on the other hand, to mount the mounting of the electronic chip and the optical element, with the support substrate. Such an assembly is notably possible thanks to the presence of an opening in the substrate which can house the chip and to the connection of the connection face of the optical element with the chip and the substrate.

The particular arrangement of the electronic chip with the optical element forms a cavity whose height is very small.

Consequently, the forces generated by the expansion of the air in the small volume of the cavity are smaller and have less risk of degrading the integrated circuit.

Moreover, this particular arrangement also allows using an optical element of smaller dimension and limiting the amount of materials which is used during the manufacture of boxes according to this aspect. Thus, the manufacturing cost can be reduced and a more compact case can be obtained.

According to one embodiment, the support substrate includes an interconnection network and the connection face of the optical element includes electrically conductive connections configured to electrically couple the electronic chip with the interconnection network.

The electrically conductive connections allow, for example, forming an electrically conductive bridge between the electronic chip and the substrate.

According to one embodiment, the connection face of the optical element includes first solder elements soldered with complementary solder elements of the electronic chip, second solder elements soldered with complementary solder elements of the mounting face of the support substrate, and metal tracks electrically connecting the first solder elements with respective second solder element.

The first solder elements and the second solder elements allow producing the conductive bridge between the chip and the interconnection network as well as ensuring a mechanical connection, by the soldered materials (typically metals).

According to one embodiment, said first solder elements and said second solder elements can be of the type: protruding solder bump, pillar or ball soldered to a complementary solder surface; and/or a solder surface soldered to a complementary protruding solder bump, pillar or ball.

According to one embodiment, the integrated circuit comprises a volume of underfill resin arranged to mechanically fix the electronic chip, the optical element, and the substrate carrier together Alternatively, according to one embodiment, the integrated circuit comprises a volume of molding resin of a molded packaging case, arranged to mechanically fix the electronic chip, the element optical and the support substrate together.

According to one embodiment, the connection face of the optical element includes an arrangement of soldered assemblies of first solder elements with the complementary solder elements of the electronic chip, such that said soldered assemblies are spaced one by one by a gap, and form a frame delimiting a peripheral region and an interior region of the chip; and said volume of resin is disposed in the spaces located between the optical element and the support substrate, and between the electronic chip and the optical element in said peripheral region, but not in the interior region of the chip.

According to one embodiment, the chip includes an optical component, such as a sensor or a transmitter, opposite to the optical element, and wherein the optical element is configured, in cooperation with the optical component, to produce an effect on an optical signal from the optical component.

Indeed, the optical element can have optical properties giving it optical functions such as a polarization, a filtering, a lensing effect, and others.

According to another aspect, there is proposed a method for manufacturing an integrated circuit comprising: supplying an electronic chip; supplying a support substrate comprising a mounting face and provided with an opening capable of containing the electronic chip; and supplying an optical element including a connection face.

The method comprises assembling the electronic chip, the optical element and the support substrate comprising: mounting the electronic chip which is connected to the connection face of the optical element and mounting the connection face of the optical element which is connected to the mounting face of the support substrate by positioning the connection face opposite to said opening such that the electronic chip is housed in said opening.

According to one implementation, the support substrate comprises an interconnection network, wherein the steps of mounting the electronic chip and the connection face comprise electrically coupling the electronic chip with the interconnection network.

According to one implementation, mounting the electronic chip comprises soldering first solder elements of the connection face of the optical element with complementary solder elements of the electronic chip, and mounting the connection face comprises soldering second solder elements of the connection face of the optical element with complementary solder elements of the mounting face of the support substrate.

According to one implementation, said first solder elements and said second solder elements can be of the type: protruding solder bump, pillar or ball capable of being soldered with a complementary solder surface; and/or solder surface capable of being soldered with a complementary protruding solder bump, pillar or ball.

According to one implementation, assembling the electronic chip, the optical element and the support substrate comprises: depositing an underfill resin which is configured to mechanically fix the electronic chip, the optical element and the support substrate together.

According to one implementation, assembling the electronic chip, the optical element and the support substrate comprises: molding a packaging case comprising an injection of a molding resin, said molding resin configured to mechanically fix the electronic chip, the optical element and the support substrate together.

According to one implementation, the resin is configured to: spread between the optical element and the support substrate; and spread between the optical element and the electronic chip locally in a peripheral region of the chip, and not between the optical element and the electronic chip in an interior region of the chip.

According to one implementation, mounting the electronic chip comprises: arranging soldered assemblies of first solder elements with the complementary solder elements of the electronic chip, such that said soldered assemblies are spaced one by one by a gap, and form a frame delimiting said peripheral region and said interior region of the chip; and said resin is sufficiently fluid to spread into spaces located between the optical element and the support substrate and between the electronic chip and the optical element, and sufficiently viscous not to seep into the gaps between each of said soldered assemblies.

According to one implementation, mounting the electronic chip connected to the mounting face of the optical element is carried out such that an optical component of the chip, such as a sensor or a transmitter, is opposite to the optical element, the optical element being configured, in cooperation with the optical component, to produce an effect on an optical signal from the optical component.

BRIEF DESCRIPTION OF THE DRAWINGS

Other advantages and features of the invention will appear on examining the detailed description of embodiment and implementation, without limitation, and the appended drawings in which.

DETAILED DESCRIPTION

Figure 1:
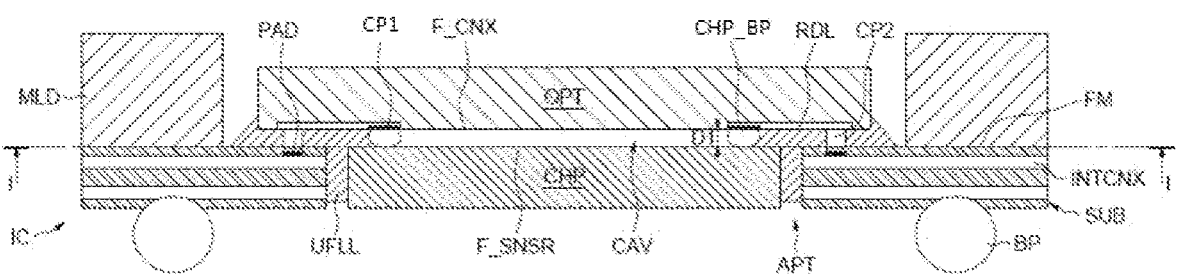
FIG. 1 schematically illustrates a sectional view of an integrated circuit.

FIG. 1 schematically illustrates a sectional view of an integrated circuit IC according to one embodiment of the invention. The integrated circuit IC comprises an assembly of an electronic integrated chip CHP (for example, an optical IC include photosensors and/or emitters and supporting circuitry), an optical element OPT and a support substrate SUB.

The support substrate SUB includes a mounting face FM and an interconnection network INTCNX configured to support electrically connecting, for example, solder pads which are disposed on the mounting face FM to connection bumps BP, or solder balls of the ball grid array "BGA" type located on the face opposite to the mounting face FM. The interconnection network INTCNX comprises conductive tracks, typically made of copper (Cu), integrated into one or more layers of dielectric material such as resin mixed with the glass fiber of the support substrate SUB.

The substrate SUB also has a (through) opening APT sized and shaped to contain the electronic chip CHP. The opening APT has dimensions configured to completely house the electronic chip CHP. However, when the thickness of the electronic chip CHP is greater than the thickness of the support substrate SUB, then a portion of the chip can extend below the bottom surface or above the top surface of the substrate SUB.

The electronic chip CHP includes a front face F_SNSR and, in particular, an optical component on the front face F_SNSR thereof. The optical component can be a receiver, such as a pixel array, capable of sensing up optical radiation originating from the outside of the circuit IC or else a transmitter, such as a laser, capable of transmitting an optical radiation towards the outside of the circuit IC.

The optical element OPT has, for example, the shape of a glass plate, and is configured to produce optical effects on an optical signal passing there through, such as one or more of a polarization, a filtering or a lensing effect. The optical element OPT includes a connection face F_CNX connected to the mounting face FM of the support substrate SUB and positioned opposite to the opening APT.

The electronic chip CHP is connected to the connection face F_CNX of the optical element OPT so as to be housed in the opening APT of the support substrate SUB. More specifically, the front face F_SNSR of the chip CHP is fixed to the connection face F_CNX of the optical element OPT, such that the optical component of the chip CHP is located opposite to the optical element OPT. Thus, the optical element OPT can produce one of the previously mentioned effects on an optical radiation originating either from the optical component in the case where the optical component is a transmitter, or from the outside of the integrated circuit IC in the case where the optical component is a receiver.

Furthermore, the connection face F_CNX of the optical element OPT includes electrically conductive connections configured to electrically couple the electronic chip CHP with the interconnection network INTCNX. The electrically conductive connections include, for example, first solder elements CP1 and second solder elements CP2 which are electrically connected together by metal tracks RDL.

The first solder elements CP1 are soldered with complementary solder elements of the electronic chip CHP, and the second solder elements CP2 are soldered with complementary solder elements of the mounting face FM of the support substrate SUB.

The electrically conductive connections then allow forming an electrically conductive bridge between the electronic chip CHP and the support substrate SUB.

In a particular example, the first solder elements CP1 may be protruding solder pillars (known to the person skilled in the art by the terms "copper pillar") or possibly solder balls, and are soldered to complementary solder surfaces, such as solder pads, provided on the front face F_SNSR of the chip CHP.

In another particular example, the front face F_SNSR of the electronic chip CHP can be provided with "complementary" solder bumps, pillars or balls, and in this case the first solder elements CP1 are solder surfaces (for example pads) provided on the connection face F_CNX of the optical element OPT, on which the complementary solder bumps, pillars or balls of the electronic chip CHP can be soldered.

Similarly, the second solder elements CP2 can be protruding solder bumps or pillars or possibly solder balls, soldered with complementary solder surfaces PAD (for example pads) belonging to the mounting face FM of the support substrate SUB. The complementary solder surfaces PAD may correspond to the solder pads which are electrically connected to the connection bumps BP by the previously described interconnection network INTCNX.

In another particular example, the mounting face FM of the substrate SUB can be provided with bumps, pillars or solder balls and in this case the second solder elements CP2 are solder surfaces (for example pads) provided on the connection face F_CNX of the optical element OPT, on which the complementary solder bumps, pillars or balls of the mounting face FM can be soldered.

The metal tracks, referred to as redistribution layers (RDL), electrically connect each of the first solder elements CP1 with respectively one of the second solder elements CP2, thus producing the conductive bridge between the chip CHP and the interconnection network INTCNX.

In addition, the materials soldered (typically metals) in the production of the conductive bridge further allow ensuring a mechanical securing between the chip CHP, the optical element OPT and the substrate SUB.

Thus, it is proposed, on the one hand, to mount the electronic chip CHP on a face of the optical element F_CNX, in a configuration corresponding to the mounting technique referred to in the art as a "flip-chip" mounting technique; and on the other hand, to mount the mounting of the electronic flip-chip CHP on the optical element OPT, with the support substrate SUB. Such an assembly is in particular possible thanks to the presence of the opening APT in the substrate SUB which can house the chip CHP, and to the connection of the chip CHP and of the substrate SUB with the connection face F_CNX of the optical element OPT.

Moreover, this particular arrangement also allows using a small optical element OPT and limiting the amount of materials which is used during the manufacture of cases for the integrated circuit IC according to this aspect. For example, the optical element OPT may be a glass plate just large enough to be fixed to the substrate SUB around the opening APT. Thus, the manufacturing cost can be reduced and a more compact case can be obtained.

The integrated circuit IC also comprises a volume of molding resin MLD of a packaging case. Such a molding resin MLD is known to the person skilled in the art. The volume of molding resin MLD includes in particular a portion of resin disposed on the mounting face FM of the substrate around the optical element OPT. The thickness of this portion of the volume of resin MLD of the packaging case may be greater than or equal to that of the optical element OPT so as to protect the optical element OPT.

Furthermore, the integrated circuit IC advantageously comprises a volume of underfill resin UFLL known to the person skilled in the art. The volume of underfill resin UFLL is arranged to mechanically fix the electronic chip CHP, the optical element OPT and the support substrate SUB together. In particular, the volume of resin UFLL extends between the electronic chip CHP and the substrate SUB and between optical element OPT and the substrate SUB.

In an alternative described below in relation to FIG. 3, the electronic chip CHP, the optical element OPT and the substrate SUB can be mechanically fixed together by a volume of molding resin MLD during the formation of the packaging casing.

Figure 2:
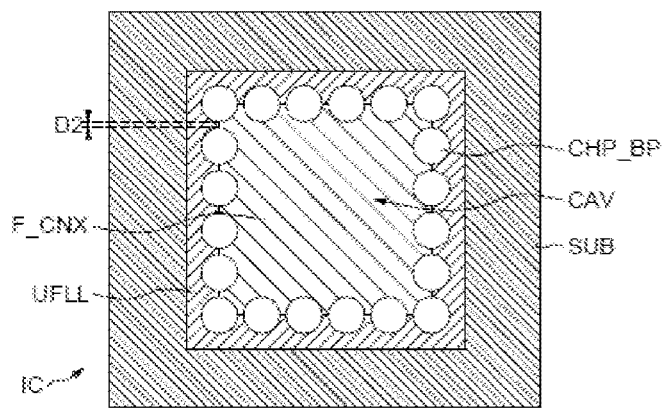
FIG. 2 illustrates a sectional and top view of the integrated circuit in relation to FIG. 1.

FIG. 2 illustrates a sectional and top view of the previously described integrated circuit IC in relation to FIG. 1 in the plane I-I of FIG. 1.

More particularly, FIG. 2 illustrates the case where the electronic chip CHP is provided with solder balls CHP_BP and where the first solder elements CP1 are solder pads on the connection face F_CNX of the optical element OPT.

The solder balls CHP_BP of the chip CHP are disposed on the front face F_SNSR of the chip CHP so as to draw a frame delimiting a peripheral region and an interior region. The solder balls CHP_BP are spaced apart by a gap D2 less than or equal to, for example, 60 μm.

The solder balls CHP_BP are soldered to the solder pads CP1 of the connection face F_CNX and form therewith soldered assemblies.

The soldered assemblies of the solder pads CP1 with the solder balls CHP_BP thus reproduce, one-by-one spaced by said gap D2, the frame drawn by the solder balls CHP_BP.

However, it is possible, from a functional point of view, that the chip CHP does not need a formation of the solder balls CHP_BP which draw said frame by being spaced one by one by the constant gap D2. Indeed, a chip may need fewer solder balls to perform its function.

In this case, provision is advantageously made for forming additional solder balls, which have no role in the operation of the chip, but which are arranged in order to maintain a constant gap D2 from ball to ball all along the frame delimiting the peripheral region and the interior region.

From a more general point of view, there is advantageously provided, on the connection face F_CNX of the optical element OPT and on the chip CHP, an advantageous arrangement of soldered assemblies of first solder elements CP1 with the complementary solder elements. The advantageous arrangement is made such that said soldered assemblies are spaced one by one by a gap D2, by forming a frame delimiting a peripheral region and an interior region of the chip CHP. The advantageous arrangement may possibly include additional soldered assemblies which have no role in the operation of the chip, but which are arranged in order to maintain the gap D2 step by step all along the frame.

In particular, the interior region of the front face F_SNSR of the electronic chip CHP contains the optical component, and not the peripheral region.

Furthermore, the volume of resin UFLL may extend between the electronic chip CHP and the optical element OPT in the peripheral region.

However, the resin UFLL does not extend beyond the first solder elements CP1 in the interior region CAV of the chip CHP. Indeed, the resin UFLL, before being polymerized, has a viscosity preventing the resin UFLL from seeping between the soldered assemblies which are spaced by the gap D2 as will be described below in relation to FIG. 10. In other words, the interior region of the front face F_SNSR of the electronic chip CHP does not contain any underfill resin UFLL because entry of the resin UFLL, before being polymerized, is impeded by the frame.

In particular, a cavity CAV corresponds to the volume delimited by the face F_SNSR of the chip CHP, the connection face F_CNX of the optical element OPT and the frame formed by the soldered assemblies of the first solder elements CP1 with the complementary solder elements CHP_BP of the chip CHP. In this example, the soldered assemblies correspond to the solder balls CHP_BP of the chip CHP, which are soldered to the solder pads of said solder elements CP1 of the connection face F_CNX of the optical element OPT.

In particular, the height D1 of the cavity CAV can be comprised, for example, between 30 μm and 100 μm, and can be defined by the height of the soldered assemblies of the first solder elements CP1 with the complementary solder elements CHP_BP. This causes the cavity volume to be extremely small relative to the cavity volumes of conventional integrated circuits in which the chips are connected to the substrate by wires.

Consequently, the forces generated by the expansion of the air contained in the small volume of the cavity are smaller and has less risk of degrading the integrated circuit IC.

Figure 3:
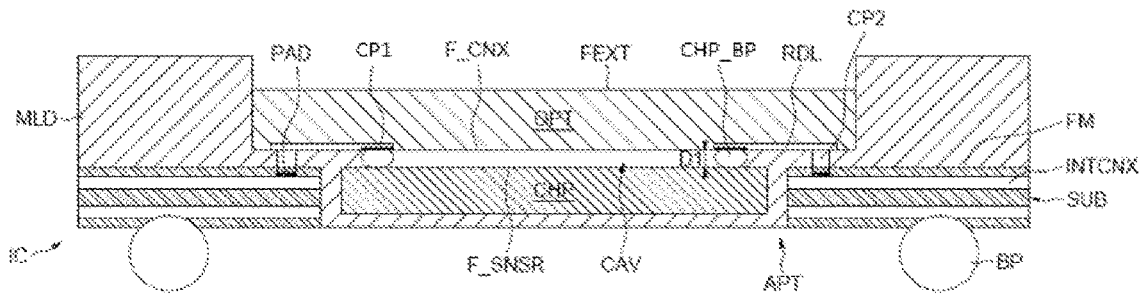
FIG. 3 illustrates a variant of the integrated circuit.

FIG. 3 illustrates a variant of the previously described integrated circuit IC in relation to FIGS. 1 and 2, in which the circuit IC comprises a molding resin MLD used to produce a molding of the advantageous packaging case.

The volume of molding resin MLD of the packaging case comprises a portion of molding resin located between the electronic chip CHP and the optical element OPT in the peripheral region of the chip CHP, that is to say outside of the cavity. The volume of resin MLD also comprises a portion of resin located between the optical element OPT and the support substrate SUB as well as a portion of resin located between the electronic chip CHP and the support substrate SUB. These resin portions of the volume of resin MLD of the packaging case can form, with the portion of resin disposed on the mounting face FM of the substrate SUB, a homogeneous assembly of molding resin. In this manner, the volume of resin MLD used to mold the packaging case of the integrated circuit IC is arranged to mechanically fix the electronic chip CHP, the optical element OPT and the support substrate SUB together.

The volume of molding resin MLD of the packaging case may also comprise an additional portion of resin configured to partially encapsulate the electronic chip CHP so as to protect the exposed face of the chip CHP in the opening APT, that is to say the face opposite to the front face F_SNSR.

FIGS. 4 to 10 illustrate steps of a method for manufacturing the integrated circuit IC which is previously described in relation to FIG. 1 and FIG. 2.

Figure 4:
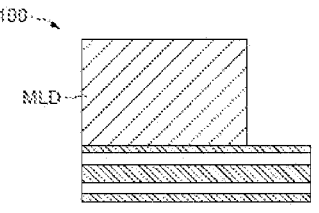
FIGS. 4 to 10 illustrate steps of a method for manufacturing the integrated circuit of FIGS. 1 and 2.
Figure 4:
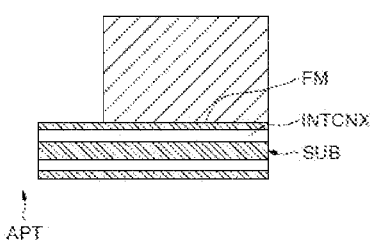

FIG. 4 illustrates a step 100 of providing a support substrate SUB and an optional step of pre-molding a packaging case with the molding resin MLD. The supplied support substrate SUB comprises an interconnection network INTCNX and a mounting face FM on which solder pads, which are electrically connected to the interconnection network INTCNX, can be formed. In step 100, an opening APT, for example extending completely through a thickness of the substrate SUB, has been formed in the substrate SUB, the opening APT being sized and shaped to be capable of containing an electronic chip CHP which will be assembled with the substrate SUB.

Figure 5:
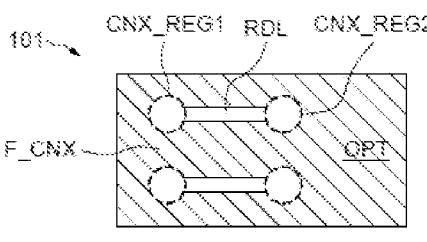

FIG. 5 illustrates a step 101 of supplying an optical element OPT. In particular, step 101 comprises a prior manufacture, and possibly independently of the formation and supply of the substrate SUB, of the optical element OPT. The manufacture of the optical element OPT comprises a formation 102 of electrically conductive connections illustrated in FIGS. 5 to 7.

The electronic chip CHP can be supplied in addition to the substrate SUB and the optical element OPT. The electronic chip CHP comprises a front face F_SNSR on which an optical component, such as a sensor or a transmitter, is formed. The chip CHP may further comprise, on the front face F_SNSR thereof, complementary solder elements such as solder balls or solder pads. In particular, the complementary solder elements, for example solder balls, are formed on a front face F_SNSR of the electronic chip CHP so as to be spaced by a gap D2 of less than 60 μm and to draw a frame delimiting an interior region and a peripheral region. The frame may in particular be formed by additional solder balls, which are not intended to connect the chip CHP to the interconnection network INTCNX. In particular, the solder balls disposed in a frame shape allow, during the mounting step 103 described in relation to FIG. 8, to inhibit and indeed preferably prevent the resins described below in relation to FIG. 10 from seeping by capillary in the interior region of the electronic chip CHP.

Figure 6:
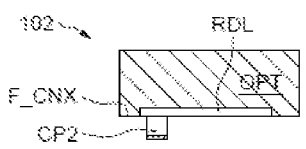

FIG. 6 illustrates a step 102 of forming electrically conductive connections. This forming step 102 comprises a deposition, also referred to in the art as "sputtering"), of a seed layer on the surface of the element optical OPT on the side of the connection face F_CNX thereof. The seed layer is a layer of a material configured for adhering to the glass surface, such as titanium (Ti) or titanium metal alloys, in particular the titanium-copper alloy (TiCu) and for forming a gripping surface on which a metal such as copper for example can adhere.

Then, forming the electrically conductive connections further comprises a masking and an electrolytic growth. The masking is provided to cover the connection face F_CNX with a photosensitive mask (not represented) and to uncover first regions CNX_REG1 and second regions CNX_REG2 so as to form, during the electrolytic growth, first solder elements CP1 in the first regions CNX_REG1 and second solder elements CP2 in the second regions CNX_REG2. In particular, the first solder elements CP1 are formed so as to be aligned with the complementary solder elements of the chip CHP during their future assembly, described in relation to FIG. 8.

The first solder elements CP1 can be, in this case, solder pads and the second solder elements CP2 can be protruding solder bumps or pillars, whose material can be copper for example. Furthermore, the mask can uncover the connection face F_CNX between the first regions CNX_REG1 and the second regions CNX_REG2 so as to form metal tracks RDL allowing electrically connecting each first solder element CP1 with the respective solder elements CP2.

The formation 102 of the electrically conductive connections then comprises an etching, which may be a chemical etching by an acid bath for example, of the connection face F_CNX. The etching allows removing the seed layer around the first solder elements CP1, the second solder elements CP2 and the metal tracks RDL.

Figure 7:
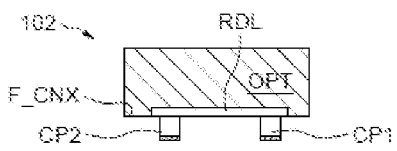

FIG. 7 illustrates a variant of the electrolytic growth which is previously described in relation to FIG. 6. In this variant, the first solder elements CP1 formed by electrolytic growth are, like the second solder elements CP2, protruding solder bumps or pillars.

Figure 9:
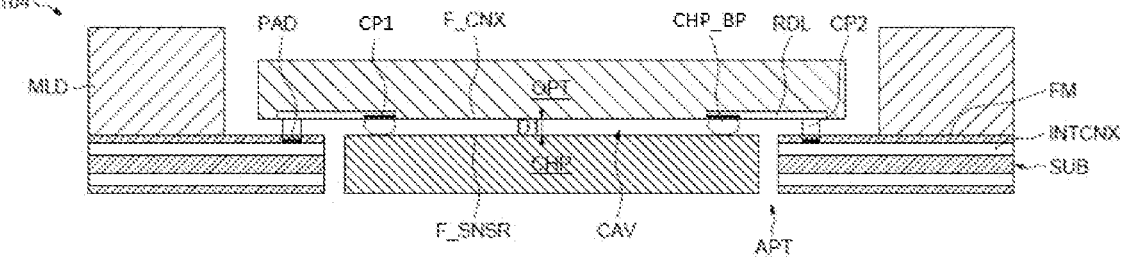
Figure 10:
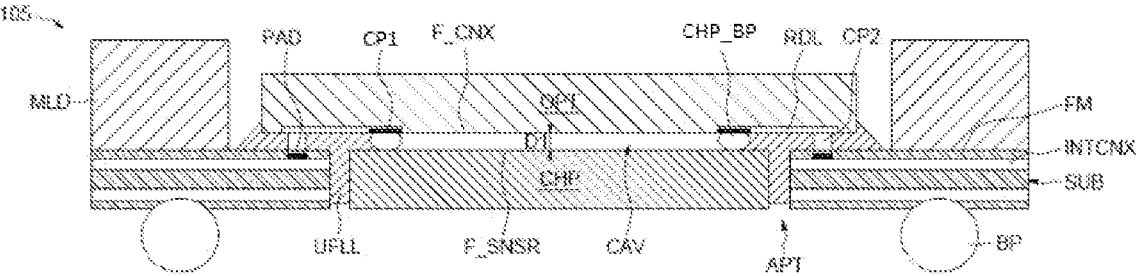

The method further comprises assembling the optical element OPT, the support substrate SUB and an electronic chip CHP which are possibly supplied separately. The assembling operation is represented in FIGS. 8 to 10.

Figure 8:
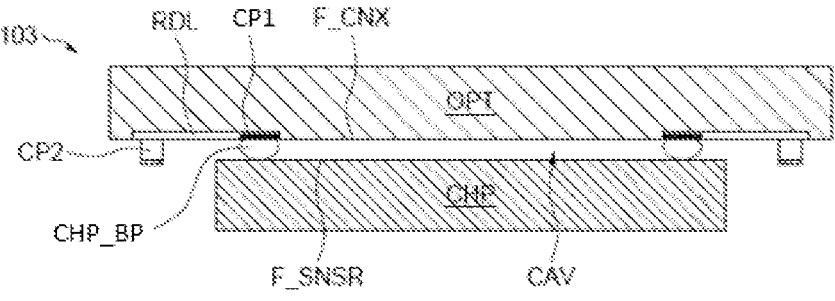

FIG. 8 illustrates a step 103 of mounting the electronic chip CHP connected to the connection face F_CNX of the optical element OPT. The mounting 103 of the chip CHP comprises a soldering of the complementary solder elements of the electronic chip CHP, such as solder balls CHP_BP with the CP1 solder pads of the connection face F_CNX of the optical element OPT. In the case where solder bumps or pillars CP1 are formed in the first regions CNX_REG1 as in the alternative which is previously described in relation to FIG. 7, the first solder elements CP1, which are solder bumps or pillars, are soldered to the solder pads of the electronic chip CHP.

The soldered assemblies of the first solder elements CP1 with the complementary solder elements CHP_BP of the chip CHP thus form a frame allowing delimiting an interior portion and a peripheral portion.

Moreover, during the mounting step 103, the optical component of the chip CHP is opposite to the optical element OPT. In this manner, the optical element OPT can produce, in cooperation with the optical component, an effect on an optical signal from the optical component.

FIG. 9 comprises a step 104 of mounting the connection face F_CNX of the optical element OPT connected to the mounting face FM of the support substrate SUB. The mounting step 104 is performed by positioning the connection face F_CNX opposite to the opening APT such that the electronic chip CHP is housed in the opening APT of the substrate SUB.

The mounting 104 of the connection face F_CNX comprises a soldering of the second solder elements CP2 of the connection face F_CNX with complementary solder elements of the mounting face FM of the substrate SUB. The complementary solder elements can be solder surfaces, such as the solder pads PAD of the mounting face FM, in particular when the second solder elements CP2 are solder bumps or pillars. Thus, the solder bumps or pillars CP2 are soldered to the solder pads PAD which establish an electrical contact between the solder bumps or pillars CP2 and the conductive tracks of the interconnection network INTCNX on the surface of the substrate SUB.

In the case where solder pads are formed in the second regions CNX_REG2 as in the alternative, which is previously described in relation to FIG. 7, the provided support substrate SUB may comprise, on the mounting face FM thereof, complementary solder bumps, pillars or balls. The complementary solder bumps, pillars or balls are soldered to the solder pads formed in the second regions CNX_REG2 of the connection face F_CNX.

Thus, the electrical coupling of the electronic chip CHP with the interconnection network INTCNX of the substrate SUB has been carried out in the steps 103 of mounting the chip CHP and of mounting 104 the connection face F_CNX.

FIG. 10 illustrates a deposition 105 of an underfill resin UFLL or, in the alternative which is previously described in relation to FIG. 3, a molding of a packaging case which comprises an injection of a molding resin MLD (not represented).

The underfill resin UFLL is configured to spread between the optical element OPT and the substrate SUB, and between the optical element OPT and the electronic chip CHP locally in the peripheral region of the chip CHP. More particularly, the underfill resin UFLL can spread by capillarity between the substrate SUB, the optical element OPT and the electronic chip CHP.

However, the underfill resin UFLL is configured not to spread into the interior region of the chip CHP between the optical element and the chip CHP. Indeed, the underfill resin UFLL is sufficiently fluid to spread into spaces located between the optical element OPT and the substrate SUB, and between the electronic chip CHP and the optical element OPT, and sufficiently viscous not to seep into the gaps between each of the soldered assemblies.

The injection of the molding resin allows injecting the molding resin at a pressure adapted to the molding. The resin is in particular injected between the optical element OPT and the substrate SUB, and between the optical element OPT and the electronic chip CHP locally in the peripheral region of the chip CHP. However, the injected molding resin is configured not to seep into the interior region in the interior region of the chip CHP between the optical element and the chip CHP. Indeed, the molding resin MLD is sufficiently fluid to spread into spaces located between the optical element OPT and the substrate SUB, and between the electronic chip CHP and the optical element OPT, and sufficiently viscous not to seep into the gaps between each of the soldered assemblies.

Connection balls BP can be formed on the face of the substrate SUB which is opposite to the mounting face FM and be electrically connected to the solder pads located on the mounting face FM of the support substrate SUB.

The invention claimed is:

1. An integrated circuit, comprising:
   an assembly of an electronic integrated circuit chip, an optical element and a support substrate;
   wherein the support substrate comprises a mounting face and has an opening configured to contain the electronic integrated circuit chip;
   wherein the optical element includes a connection face connected to the mounting face of the support substrate and is positioned opposite to said opening;

wherein the electronic integrated circuit chip is connected to the connection face of the optical element such that the electronic chip is housed in said opening of the support substrate; and wherein the connection face of the optical element includes an arrangement of soldered assemblies of first solder elements with the complementary solder elements of the electronic integrated circuit chip, said soldered assemblies being spaced one by one by a gap to form a frame delimiting a peripheral region and an interior region of the electronic integrated circuit chip; and a volume of resin arranged to mechanically fix the electronic integrated circuit chip, the element optical and the support substrate together, said volume of resin being disposed in spaces located between the optical element and the support substrate, and between the electronic chip and the optical element in said peripheral region, but impeded from entering the interior region of the electronic integrated circuit chip by said frame.

2. The integrated circuit according to claim 1, wherein the support substrate includes an interconnection network and the connection face of the optical element includes electrically conductive connection configured to electrically couple the electronic integrated circuit chip to the interconnection network.

3. The integrated circuit according to claim 1, wherein the connection face of the optical element includes:

first solder elements soldered with complementary solder elements of the electronic integrated circuit chip;

second solder elements soldered with complementary solder elements of the mounting face of the support substrate; and metal tracks electrically connecting the first solder elements with respective second solder elements.

4. The integrated circuit according to claim 3, wherein said first solder elements and said second solder elements are of a type selected from the group consisting of:

protruding solder bump, pillar or ball soldered to a complementary solder surface; and a solder surface soldered to a complementary protruding solder bump, pillar or ball.

5. The integrated circuit according to claim 1, further comprising a volume of underfill resin arranged to mechanically fix the electronic integrated circuit chip, the optical element, and the substrate carrier together.

6. The integrated circuit according to claim 1, wherein said volume of resin provides a molded packaging case.

7. A method for manufacturing an integrated circuit, comprising:

supplling an electronic integrated circuit chip;

supplying a support substrate comprising a mounting face and provided with an opening configured to contain the electronic integrated circuit chip;

supplying an optical element including a connection face;

assembling the electronic integrated circuit chip, the optical element and the support substrate by:

mounting the electronic integrated circuit chip which is connected to the connection face of the optical element; and mounting the connection face of the optical element which is connected to the mounting face of the support substrate by positioning the connection face opposite to said opening such that the electronic integrated circuit chip is housed in said opening;

wherein mounting the electronic integrated circuit chip comprises arranging soldered assemblies of first solder elements with the complementary solder elements of the electronic integrated circuit chip, such that said soldered assemblies are spaced one by one by a gap, and form a frame delimiting said peripheral region and said interior region of the electronic integrated circuit chip; and depositing a resin which is configured to mechanically fix the electronic integrated circuit chip, the optical element and the support substrate together, wherein said resin is sufficiently fluid to spread into spaces located between the optical element and the support substrate and between the electronic integrated circuit chip and the optical element, and sufficiently viscous not to seep through the gaps between said soldered assemblies which form the frame.

8. The integrated circuit according to claim 1, wherein the electronic integrated circuit chip includes an optical circuit component opposite to the optical element, and wherein the optical element is configured, in cooperation with the optical circuit component, to produce an effect on an optical signal from the optical circuit component.

9. The method according to claim 7, wherein mounting the electronic integrated circuit chip connected to the mounting face of the optical element comprises arranging an optical component of the electronic integrated circuit chip, such as a sensor or a transmitter, in a position opposite to the optical element, the optical element being configured, in cooperation with the optical component, to produce an effect on an optical signal from the optical component.

10. The method according to claim 9, wherein the support substrate comprises an interconnection network, and wherein mounting the electronic integrated circuit chip and the connection face comprises electrically coupling the electronic integrated circuit chip with the interconnection network.

11. The method according to claim 9, wherein mounting the electronic integrated circuit chip comprises soldering first solder elements of the connection face of the optical element with complementary solder elements of the electronic integrated circuit chip, and wherein mounting the connection face comprises soldering of second solder elements of the connection face of the optical element with complementary solder elements of the mounting face of the support substrate.

12. The method according to claim 11, wherein said first solder elements and said second solder elements are of a type selected from the group consisting of:

protruding solder bump, pillar or ball capable of being soldered with a complementary solder surface; and/or solder surface capable of being soldered with a complementary protruding solder bump, pillar or ball.

13. The method according to claim 9, wherein assembling the electronic integrated circuit chip, the optical element and the support substrate comprises depositing an underfill resin which is configured to mechanically fix the electronic integrated circuit chip, the optical element and the support substrate together.

14. The method according to claim 13, wherein the underfill resin is configured to:

spread between the optical element and the support substrate; and spread between the optical element and the electronic integrated circuit chip locally in a peripheral region of the electronic integrated circuit chip, and not between the optical element and the electronic integrated circuit chip in an interior region of the electronic integrated circuit chip.

15. The method according to claim 9, wherein depositing the resin comprises molding a packaging case comprising an injection of a molding resin.

16. The method according to claim 15, wherein the molding resin is configured to:

spread between the optical element and the support substrate; and spread between the optical element and the electronic integrated circuit chip locally in a peripheral region of the electronic integrated circuit chip, and not between the optical element and the electronic integrated circuit chip in an interior region of the electronic integrated circuit chip.

* * * * *